(12) United States Patent
Hu

(10) Patent No.: US 9,372,769 B2
(45) Date of Patent: Jun. 21, 2016

(54) SERVER AND INSPECTING METHOD THEREOF

(71) Applicants: Inventec (Pudong) Technology Corporation, Shanghai (CN); INVENTEC CORPORATION, Taipei (TW)

(72) Inventor: Peng Hu, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 223 days.

(21) Appl. No.: 14/163,765

(22) Filed: Jan. 24, 2014

(65) Prior Publication Data
US 2015/0149754 A1 May 28, 2015

(30) Foreign Application Priority Data
Nov. 28, 2013 (CN) .......................... 2013 1 0625287

(51) Int. Cl.
*G06F 11/22* (2006.01)
(52) U.S. Cl.
CPC ........ *G06F 11/2289* (2013.01); *G06F 11/2284* (2013.01)
(58) Field of Classification Search
CPC ........................ G06F 11/2284; G06F 11/2289
See application file for complete search history.

(56) References Cited

U.S. PATENT DOCUMENTS

| | | | | |
|---|---|---|---|---|
| 2009/0132799 | A1* | 5/2009 | Brumley | G06F 9/44505 713/100 |
| 2010/0262815 | A1* | 10/2010 | Bozek | G06F 9/4416 713/1 |
| 2013/0080752 | A1* | 3/2013 | Liao | G06F 9/4403 713/1 |
| 2013/0138934 | A1* | 5/2013 | Lin | G06F 9/4411 713/1 |
| 2013/0198504 | A1* | 8/2013 | Arnold | G06F 9/44 713/2 |

* cited by examiner

*Primary Examiner* — Thomas Lee
*Assistant Examiner* — Chad Erdman
(74) *Attorney, Agent, or Firm* — Locke Lord LLP; Tim Tingkang Xia, Esq.

(57) ABSTRACT

Disclosed herein are a server and an inspecting method thereof. The server comprises a baseboard management controller (BMC), a non-volatile memory coupled with the baseboard management controller, and a basic input/output system. After the server is powered on, the basic input/output system starts running, performs power-on self-test for the server to generate current hardware configuration data. The BMC then determines whether preset hardware configuration data, stored beforehand in the non-volatile memory, and the current one agree. If the preset and the current hardware configuration data have one or more mismatches, the BMC records the mismatch or mismatches in an event log.

12 Claims, 2 Drawing Sheets

SERVER AND INSPECTING METHOD THEREOF

CROSS-REFERENCE TO RELATED APPLICATIONS

This non-provisional application claims priority under 35 U.S.C. §119(a) on Patent Application No. 201310625287.2 filed in People's Republic of China on Nov. 28, 2013, the entire contents of which are hereby incorporated by reference.

TECHNICAL FIELD

The present invention relates to server technology, particularly to a server and its inspecting method.

BACKGROUND

After a server is powered up, its basic input/output system (BIOS) may perform power-on self-test (POST) for it to initialize the swarm of components on the motherboard and provide the necessary runtime environment for the operating system. The BIOS usually disables components that cannot be properly initialized during POST and records part of the POST results locally. To detect and solve problems that may have occurred, a user needs to operate the server and peruse the records on site. In other words, when it comes to maintaining, say, a data center with incoming servers, there is not an apparent way to thoroughly inventory, inspect, and verify the hardware configuration of the new machines.

SUMMARY

In light of the above, the present invention discloses a server and a inspecting method for efficiently and conveniently monitoring and managing the server.

In the server inspecting method provided by this disclosure, a server first started up, its BIOS beginning to operate. The BIOS performs a power-on self-test of the server to generate current hardware configuration data, and a baseboard management controller (BMC) of the server determines whether preset and the current hardware configuration data match. If the current and the preset hardware configuration data have one or more mismatches, the BMC records it or them in an event log. The BMC is coupled with a non-volatile memory of the server and adapted for causing the server to start up. The preset hardware configuration data is stored beforehand in the non-volatile memory.

The server provided by this disclosure comprises a non-volatile memory for storing preset hardware configuration data, a BIOS for performing a power-on self-test of the server to generate current hardware configuration data, and a BMC, coupled with the non-volatile memory, for causing the server to start up, determining whether preset hardware configuration data and the current hardware configuration data match, and, if the current hardware configuration data and the preset hardware configuration data have one or more mismatches, recording the mismatch or mismatches in an event log.

Additional support from centralized management software or hardware is not a prerequisite for the server and the inspecting method of the present invention due to the prevalence of BIOS and BMC. In short, the BMC is able to detect changes and anomalies in the server by comparing the current and the preset configuration data, facilitating highly efficient and convenient monitoring and management of the server hardware.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

Figure 1:
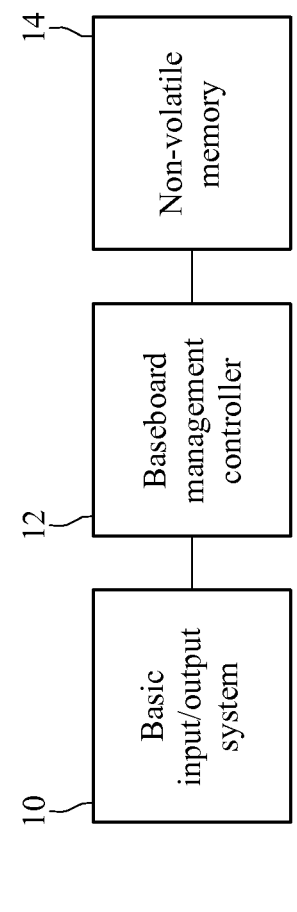
FIG. 1 is a high-level block diagram of a server, in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1. As shown in this high-level block diagram, in one embodiment, a server 1 comprises a basic input/output system (BIOS) 10, a baseboard management controller (BMC) 12, and a non-volatile memory 14. Both the BIOS 10 and the non-volatile memory 14 are coupled with the BMC 12. To streamline the description, the central processing unit (CPU), volatile random-access memory (RAM) used by the CPU (e.g. a dual in-line memory module or DIMM), heat-dissipation modules, power supply, hard disk drives, RAID (redundant array of independent disks) card, sensors for the aforementioned hardware, etc that the server 1 may further include are not depicted in FIG. 1.

The BMC 12 is usually one part of the Intelligent Platform Management Interface (IPMI) of the server 1. As the processing core of the IPMI, the BMC 12 monitors sensors at multiple locations within the server 1 to get a handle of and automatically report the temperature, power stability, and other operational status of the server 1. The BMC 12 may also cause the server 1 to start up or shut down. The server 1 can be started up in other ways; for example, the server 1 can be started up by pressing a power button on a motherboard of the server 1. The non-volatile memory 14 may be flash memory, other types of electrically erasable programmable read-only memory (EEPROM), or other non-volatile storage, coupled with the BMC 12 on an I²C (Inter-Integrated Circuit) or a SPI (Serial Peripheral Interface) bus.

The operation of the BIOS 10 involves the CPU, the volatile RAM, and a dedicated read-only memory where the program code of the BIOS 10 is stored. The CPU executes this program code so that the BIOS 10 starts running and performs the power-on self-test (POST) for the bootstrapping server 1. Generally speaking, the BIOS 10 can be seen as a function block that starts working after the server 1 is powered up. The coupling between the BIOS 10 and the BMC 12 may be, but not limited to, a LPC (Low Pin Count) bus.

The POST of the server 1 may include the BIOS 10 disabling cores found to be broken during the built-in self-test of the CPU, detecting and initializing the volatile RAM and disabling broken modules, scanning for peripheral hardware connected to the motherboard, distributing resource accordingly, and collecting relevant information based on the said steps, such as the number, health, make, model, and manufacture date of each component. Within the scope of this disclosure, the said acquired information is known as hardware configuration data or HCD.

Figure 2:
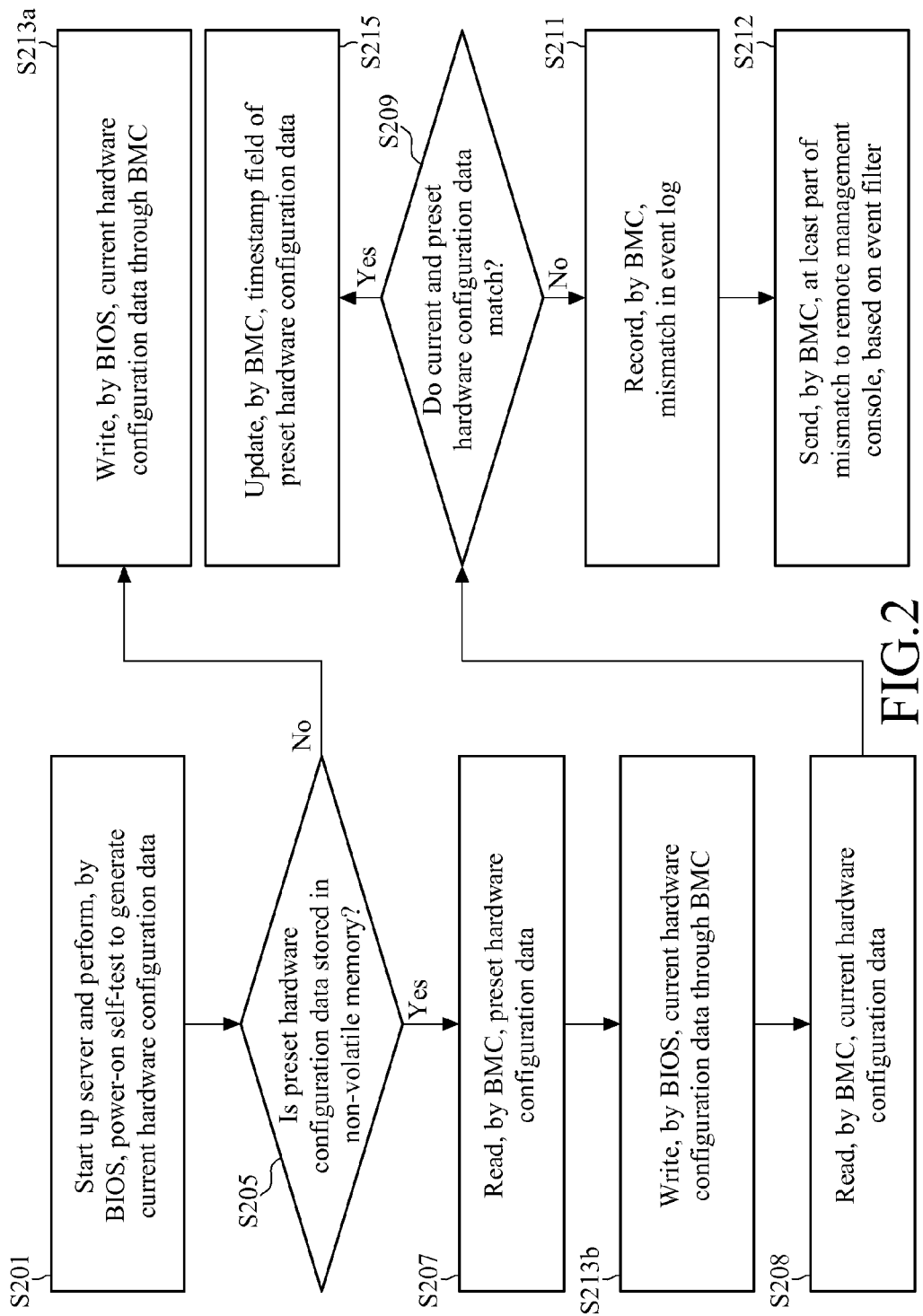
FIG. 2 is a flowchart of a server inspecting method, in accordance with one embodiment of the present invention.

Please refer to FIG. 2 with regard to FIG. 1. As shown in this flowchart, in step S201, the server 1 is turned on, and the BIOS 10 begins its operation and performs a POST to generate current HCD, as described in the previous paragraph. The generated HCD may be temporarily saved in the volatile RAM of the server 1. In steps S205 and S207, the BMC 12 determines whether preset HCD can be found in the non-volatile memory 14, and if so, tries to procure the preset HCD from the non-volatile memory 14. The preset HCD may be the HCD generated during (and current to) a previous bootstrap of the server 1, or may be written into the non-volatile memory 14 by an external party according to, for example, a user-anticipated hardware configuration of the server 1. Whether the preset and the current HCD agree is verified by the BMC 12 in step S209; if they match, the same hardware configuration is recorded by both HCD. Specifically, in step S205, the BMC 12 determines whether the non-volatile memory 14 has stored a copy of HCD. If not, the server 1 may be in its maiden run and no POST has ever been carried out, or the preset HCD in the non-volatile memory 14 has disappeared or been destroyed artificially or unexpectedly. In this case, the BIOS 10 may simply store the current HCD into the non-volatile memory 14 through the BMC 12 in step S213a. If the answer to step S205 is positive, the BMC 12 reads the preset HCD from the non-volatile memory 14 in step S207.

In step S213b, the BIOS 10 stores the current HCD into the non-volatile memory 14 through the BMC 12, or to put it differently, replaces the preset HCD originally saved therein with the current HCD, which is then read by the BMC 12 from the non-volatile memory 14 in step S208. Please note that step S207 must take place prior to step S213b, though in the present invention the BMC 12 may obtain the preset HCD from the non-volatile memory 14 either before or during the POST carried out by the BIOS 10.

In one embodiment, "obtaining from" or "storing into the non-volatile memory 14" as mentioned in steps S207, S208, S213a, or S213b pertains to accessing a reserved storage block in the non-volatile memory 14 by or with the help of the BMC 12. The storage block, not smaller than 250 bytes in length, is dedicated to the storage of HCD in a user-defined format. The storage of the current HCD into this block pertains to positioning or addressing the preset HCD conforming to the said format so that the current HCD, also conforming to the format, are completely covered by the preset HCD. The preset hardware configuration data is read from the storage block of the non-volatile memory 14, and the current hardware configuration data is written into the storage block to correspondingly replace the preset hardware configuration data in the storage block.

In step S209, the BMC 12 determines whether there is disagreement between the current and the preset HCD as a result of, say, a change in the hardware configuration of the server 1 or some malfunctioning hardware being disabled. Step S209 generally pertains to the BMC 12 comparing the two bit strings representing the current and the preset HCD. If they match, the BMC 12 may merely update a timestamp field of the preset HCD in step S215. If they do not, in one embodiment, the BMC 12 records in step S211 any mismatch for future reference. In practice, the sensor event log (SEL, also known by various other names, e.g. system error log) of the BMC 12 may be employed to store items of disagreement found in step S209.

In one embodiment, the BMC 12 sends selected mismatch or mismatches to a remote management console outside of the server 1 in step S212. The BMC 12 may send none, some, or all of the items of disagreement according to the settings of an event filter. In practice, which, how, and whither items are sent may be designated in the platform event filter (PEF) of the BMC 12. The transport means includes, but is not limited to, electronic mails or SNMP (Simple Network Management Protocol) alerts, directed to e-mail or Internet Protocol addresses.

Any person skilled in the art should be able to freely specify the aforementioned format for HCD generation and parsing. That the format is user-defined, in addition to introducing management flexibility, also provides a form of theft protection for the HCD. In other words, the HCD may well be a meaningless series of bits that cannot be parsed in the eyes of a malicious outsider. Of course, a reference format may be applied in the server 1 by default, as exemplified in the following Table 1:

TABLE 1

| Name of Parameter | Length (Bytes) | Data Type |
|---|---|---|
| Timestamp | 4 | String |
| Hardware Configuration Overview | 1 | Boolean |
| CPU Configuration | 30 | String |
| Hard Disk Drive Configuration | 30 | String |
| RAM Configuration | 30 | String |
| Power Supply Configuration | 30 | String |
| RAID Card Configuration | 30 | String |
| Other Hardware Configuration | 90 | Generic |

The Timestamp field keeps record of the time the HCD are generated, optionally as UTC (Coordinated Universal Time). In one embodiment, three of the eight bits of Hardware Configuration Overview are reserved for future use (set zero or false when unused), and the rest five signify whether there is, respectively, information for the CPU, hard disk drives, RAM, power supply, and RAID card of the server 1 in the HCD. The CPU Configuration may include an identifier of the maker and model of the CPU, for instance "Intel Xeon Processor E5-2440."

Each entry in the sensor event log in the IPMI specification is sixteen bytes long, wherein the twelfth byte is Sensor Number and the fourteen to sixteenth bytes are customizable Event Data 1, 2, and 3. In one embodiment, Sensor Number may be the first field of a recorded mismatch, Event Data 2 the second, associated with the preset HCD, and Event Data 3 the third, associated with the current HCD. For example, the hexadecimal number 8A is not a common sensor designation and may therefore represent the CPU, the number 8B can be used for the hard disk drives, and so on. If the first field or Sensor Number of an item of disagreement is 8B, then the corresponding second field may have the number of the hard disk drives (1 to 255) in the preset HCD, and the third field that in the current HCD. In another embodiment, the BMC 12 fills Event Data 1 with a special bit pattern, e.g. the hexadecimal number A0, to signal that the entry is composed by the server inspecting method of the present invention.

Owing to the prevalence of BIOS and BMC, additional hardware support is not a prerequisite for the present invention, where changes in hardware configuration can be oversaw and analyzed with state-of-the-art software. To summarize, the BMC as the main actor accesses the current and the preset HCD, replaces the latter with the former based on comparison results (such as hardware errors or a difference in the number of components between the two), and proactively records and notifies the user of the results in some embodiments.

What is claimed is:

1. A server inspecting method comprising:
   starting up a server;
   performing, by a basic input/output system (BIOS) of the server, a power-on self-test of the server to generate current hardware configuration data; and
   determining, by a baseboard management controller (BMC) of the server, whether preset hardware configuration data and the current hardware configuration data match, the BMC coupled with a non-volatile memory of the server and capable of causing the server to start up, the preset hardware configuration data stored beforehand in the non-volatile memory;
   wherein when the current hardware configuration data and the preset hardware configuration data have one or more mismatches, the BMC records the mismatch or mismatches in an event log; and
   wherein the event log has a first field, a second field, and a third field, the first field associated with names of hardware of the server, the second field associated with the preset hardware configuration data, the third field associated with the current hardware configuration data.

2. The server inspecting method of claim 1, further comprising before the step of determining whether preset hardware configuration data and the current hardware configuration data match:
   reading, by the BMC, the preset hardware configuration data from the non-volatile memory;
   writing, by the BIOS, the current hardware configuration data into the non-volatile memory through the BMC so as to correspondingly replace the preset hardware configuration data; and
   reading, by the BMC, the current hardware configuration data from the non-volatile memory.

3. The server inspecting method of claim 2, wherein a storage block is reserved in the non-volatile memory, the preset hardware configuration data is read from the storage block of the non-volatile memory, and the current hardware configuration data is written into the storage block to correspondingly replace the preset hardware configuration data in the storage block.

4. The server inspecting method of claim 1, further comprising:
   sending, by the BMC, at least one of the mismatch or mismatches to a remote management console extraneous to the server, based on a setting of an event filter.

5. The server inspecting method of claim 1, wherein when the current hardware configuration data and the preset hardware configuration data match, the BMC updates a timestamp field of the preset hardware configuration data.

6. The server inspecting method of claim 1, further comprising:
   determining, by the BMC, whether the non-volatile memory stores the preset hardware configuration data;
   wherein when the non-volatile memory does not store the preset hardware configuration data, the BIOS writes the current hardware configuration data into the non-volatile memory through the BMC.

7. A server comprising:
   a non-volatile memory for storing preset hardware configuration data;
   a basic input/output system (BIOS) for performing a power-on self-test of the server to generate current hardware configuration data; and
   a baseboard management controller (BMC) coupled with the non-volatile memory and capable of causing the server to start up and determining whether preset hardware configuration data and the current hardware configuration data match;
   wherein when the current hardware configuration data and the preset hardware configuration data have one or more mismatches, the BMC records the mismatch or mismatches in an event log; and
   wherein the event log has a first field, a second field, and a third field, the first field associated with names of hardware of the server, the second field associated with the preset hardware configuration data, the third field associated with the current hardware configuration data.

8. The server of claim 7, wherein the BIOS is further adapted for writing the current hardware configuration data into the non-volatile memory through the BMC so as to correspondingly replace the preset hardware configuration data in the non-volatile memory, and the BMC is further adapted for reading the current hardware configuration data from the non-volatile memory and for reading the preset hardware configuration data from the non-volatile memory before the BIOS writes the current hardware configuration data into the non-volatile memory.

9. The server of claim 8, wherein a storage block is reserved in the non-volatile memory, and the preset hardware configuration data is read from the storage block of the non-volatile memory and the current hardware configuration data is written into the storage block to correspondingly replace the preset hardware configuration data in the storage block.

10. The server of claim 7, wherein the BMC is further adapted for sending at least one of the mismatch or mismatches to a remote management console extraneous to the server, based on a setting of an event filter.

11. The server of claim 7, wherein when the current hardware configuration data and the preset hardware configuration data match, the BMC is further adapted for updating a timestamp field of the preset hardware configuration data.

12. The server of claim 7, wherein the BMC is further adapted for determining whether the non-volatile memory stores the preset hardware configuration data, and when the preset hardware configuration data is not stored in the non-volatile memory, the BIOS writes the current hardware configuration data into the non-volatile memory through the BMC.

* * * * *